(12) United States Patent
Ishak

(10) Patent No.: US 7,029,118 B2
(45) Date of Patent: Apr. 18, 2006

(54) WATERMAN'S SUNGLASS LENS

(76) Inventor: Andy Ishak, 920 Revolution St., Havre de Grace, MD (US) 21078

( * ) Notice: Subject to any disclaimer, the term of this patent is extended or adjusted under 35 U.S.C. 154(b) by 0 days.

(21) Appl. No.: 10/998,414

(22) Filed: Nov. 30, 2004

(65) Prior Publication Data

US 2005/0099589 A1    May 12, 2005

Related U.S. Application Data

(63) Continuation-in-part of application No. 10/000,062, filed on Nov. 2, 2001, now abandoned.

(60) Provisional application No. 60/245,304, filed on Nov. 3, 2000, provisional application No. 60/266,497, filed on Feb. 5, 2001.

(51) Int. Cl.
*G02C 7/10* (2006.01)
*G02C 7/12* (2006.01)

(52) U.S. Cl. .................. 351/163; 351/166; 351/44; 351/49

(58) Field of Classification Search ............... 351/41, 351/44, 45, 49, 159, 163–166
See application file for complete search history.

(56) References Cited

U.S. PATENT DOCUMENTS 4,878,748 A * 11/1989 Johansen et al. ............ 351/44
5,694,240 A * 12/1997 Sternbergh ................ 359/359
5,702,819 A * 12/1997 Gupta et al. ............... 428/412
6,220,703 B1 * 4/2001 Evans et al. ............... 351/163
6,334,680 B1 * 1/2002 Larson ...................... 351/159

OTHER PUBLICATIONS

Philip Baumeister and Gerald Pincus, "Optical Interference Coatings", Scientific American, Dec., 1970.*
http://web.archive.org/web/20001008003354/www.nacl.com/custom.htm.*
CRC Handbook of Chemistry and Physics, 85th Edition, 2004-2005, p. 10-217.*

* cited by examiner

*Primary Examiner*—Scott J. Sugarman
(74) *Attorney, Agent, or Firm*—Law Offices of Royal W. Craig

(57) ABSTRACT

An improved ten-layer performance polarized lens for sunglasses. The lens design maximizes visual acuity while minimizing blue-light transmission using a multi-layer dielectric mirror to reduces glare and overall light transmission, two layers of high-contrast blue-blocking amber CR-39 plastic or polycarbonate, sandwiching a polarizing layer. An outer hydrophobic overcoat is also provided to protect against haze, delamination, and smudging, The foregoing layers are arranged to provide a balanced light transmission profile optimum for use on the water in which 100% of UV-A & B light is absorbed to at least 400 nm. The resulting dielectric-mirrored sunglass lens reduces both overall light transmission and ocular photochemical damage.

15 Claims, 8 Drawing Sheets

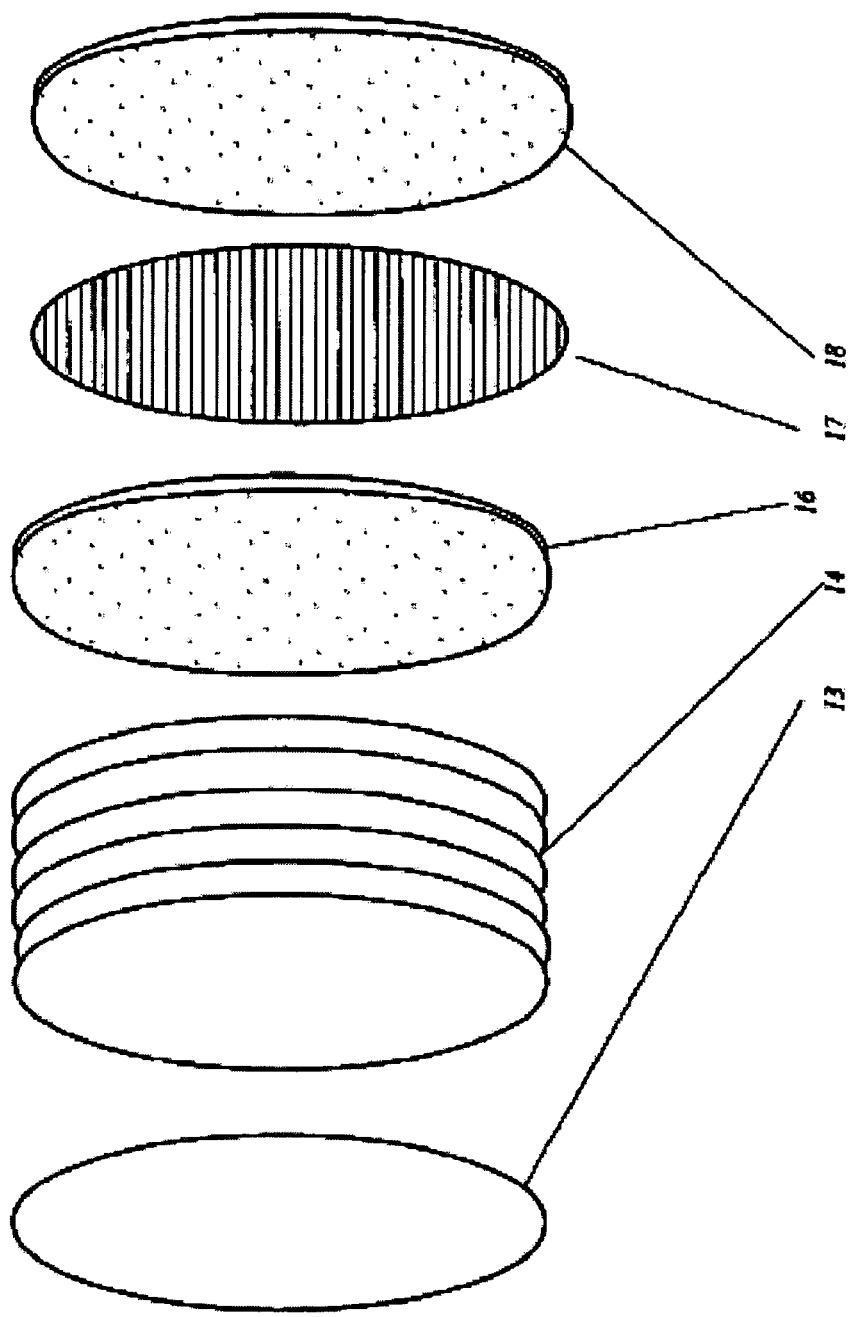

Spectral Analysis

| | TRANS | x | y |
|---|---|---|---|
| Iluminate C Photopic | 7.66% | 0.4803 | 0.4827 |
| Iluminate D65 | 7.61% | | |
| Iluminate A | 8.52% | | |
| Iluminate C Scotopic | 2.96% | | |
| Average Blue Light | 0.34% | | |
| UVA | 0.00% | | |
| UVB | 0.00% | | |

| nm | %T | nm | %T |
|---|---|---|---|
| 300 | 0.00 | 550 | 8.54 |
| 310 | 0.00 | 560 | 9.83 |
| 320 | 0.00 | 570 | 10.59 |
| 330 | 0.00 | 580 | 10.73 |
| 340 | 0.00 | 590 | 10.49 |
| 350 | 0.00 | 600 | 10.15 |
| 360 | 0.00 | 610 | 9.77 |
| 370 | 0.00 | 620 | 9.46 |
| 380 | 0.00 | 630 | 9.20 |
| 390 | 0.00 | 640 | 9.00 |
| 400 | 0.01 | 650 | 8.87 |
| 410 | 0.11 | 660 | 8.83 |
| 420 | 0.30 | 670 | 8.85 |
| 430 | 0.37 | 680 | 8.98 |
| 440 | 0.38 | 690 | 9.15 |
| 450 | 0.36 | 700 | 9.38 |
| 460 | 0.35 | 710 | 9.68 |
| 470 | 0.36 | 720 | 10.01 |
| 480 | 0.48 | 730 | 10.37 |
| 490 | 0.88 | 740 | 10.77 |
| 500 | 1.09 | 750 | 11.17 |
| 510 | 2.33 | 760 | 11.56 |
| 520 | 4.19 | 770 | 11.97 |
| 530 | 5.87 | 780 | 12.31 |
| 540 | 7.23 | 790 | 12.58 |

ANSI Z80.3

| | Red | Yellow | Green | D65 |
|---|---|---|---|---|
| TRANS | 9.14% | 9.79% | 6.31% | 7.61% |
| TEST | Fail | Fail | Fail | |
| X | | 9.11 | 0.75 | 7.90 |
| Y | 0.99 | 8.69 | 1.37 | 8.04 |
| Z | | 0.02 | 0.13 | 0.59 |
| x | | 0.5758 | 0.3352 | 0.4779 |
| y | | 0.4232 | 0.6063 | 0.4666 |
| Chromiticity | | Pass | Pass | Pass |

This is a SPECIAL PURPOSE LENS

CEN 94

| | Red | Yellow | Green | Blue |
|---|---|---|---|---|
| TRANS | 9.57% | 9.76% | 6.31% | 4.38% |
| Q | 1.26 | 1.26 | 0.83 | 0.58 |
| TEST | Pass | Pass | Pass | Fail |

This is a FILTER CATEGORY 4

| | Max | Test | Delta |
|---|---|---|---|
| T(280-315) | 0.00 | Pass | 0.76 |
| T(315-350) | 0.00 | Pass | 3.81 |
| SOLAR UVA | 0.00 | Pass | 3.81 |

AUSTRALIAN STANDARDS

| | Red | Violet |
|---|---|---|
| FACTOR | 1.20 | 0.04 |
| This is a | SPECIFIC | |
| | FAIL | FAIL |

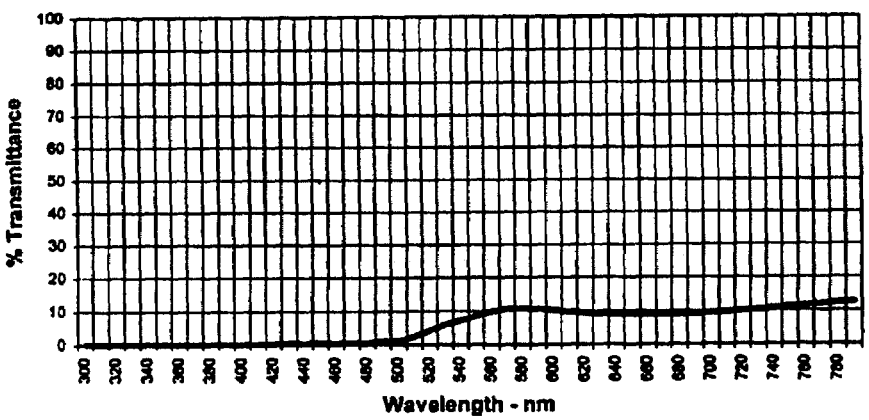

FIG. 2  O-VIA012901-04-01 (Amber Mirror)

For Test: Definition - ANSI Z87.1

Lens Sample Group Description

| Lens Samples | | Substrate (Lens Material) | | Coatings (Hard Coat, AR, etc) | |
|---|---|---|---|---|---|
| One Lens Sample Group | | | | | |
| Manufacturer: | Bayz | Lens Material: | unk | Type: | Polarized |
| Lens Type: | FSV | Index of Refraction: | | Comments: | |
| Requested By: | DR. Ishak | Lens Density: | | Polarized / Amber | |
| | | Report valid thru: | 09/16/01 | | |

| Test Number | Definition | Pass/Fail |
|---|---|---|
| Z-BZS031601-01-01-01 | 20 | Pass |
| Z-BZS031601-01-01-02 | 34 | Pass |
| Z-BZS031601-01-01-03 | 34 | Pass |

ANSI Z87.1 Requirement
Pattern 20 in both directions

FIG. 3

Spectral Analysis

| | TRANS | x | y |
|---|---|---|---|
| Iluminate C Photopic | 9.91% | 0.4766 | 0.4822 |
| Iluminate D65 | 9.85% | | |
| Iluminate A | 10.99% | | |
| Iluminate C Scotopic | 3.94% | | |
| Average Blue Light | 0.51% | | |
| UVA | 0.00% | | |
| UVB | 0.00% | | |

| nm | %T | nm | %T |
|---|---|---|---|
| 300 | 0.00 | 550 | 11.10 |
| 310 | 0.00 | 560 | 12.64 |
| 320 | 0.00 | 570 | 13.52 |
| 330 | 0.00 | 580 | 13.86 |
| 340 | 0.00 | 590 | 13.37 |
| 350 | 0.00 | 600 | 12.96 |
| 360 | 0.00 | 610 | 12.52 |
| 370 | 0.00 | 620 | 12.15 |
| 380 | 0.00 | 630 | 11.83 |
| 390 | 0.00 | 640 | 11.60 |
| 400 | 0.01 | 650 | 11.45 |
| 410 | 0.17 | 660 | 11.40 |
| 420 | 0.44 | 670 | 11.43 |
| 430 | 0.55 | 680 | 11.55 |
| 440 | 0.55 | 690 | 11.75 |
| 450 | 0.53 | 700 | 11.99 |
| 460 | 0.52 | 710 | 12.31 |
| 470 | 0.53 | 720 | 12.66 |
| 480 | 0.72 | 730 | 13.04 |
| 490 | 1.28 | 740 | 13.45 |
| 500 | 1.52 | 750 | 13.84 |
| 510 | 3.20 | 760 | 14.23 |
| 520 | 5.63 | 770 | 14.62 |
| 530 | 7.81 | 780 | 14.92 |
| 540 | 9.52 | 790 | 15.16 |

ANSI Z80.3

| | Red | Yellow | Green | D65 |
|---|---|---|---|---|
| TRANS | 11.76% | 12.56% | 8.24% | 9.85% |
| TEST | Pass | Pass | Pass | |
| X | | 11.57 | 0.97 | 10.15 |
| Y | 1.28 | 8.58 | 1.78 | 10.41 |
| Z | | 0.02 | 0.19 | 0.84 |
| x | | 0.5756 | 0.3308 | 0.4742 |
| y | | 0.4233 | 0.6054 | 0.4863 |
| Chromiticity | | Pass | Pass | Pass |

This is a GENERAL PURPOSE LENS

CEN 94

| | Red | Yellow | Green | Blue |
|---|---|---|---|---|
| TRANS | 12.27% | 12.52% | 8.25% | 5.77% |
| Q | 1.25 | 1.27 | 0.84 | 0.59 |
| TEST | Pass | Pass | Pass | Fail |

This is a FILTER CATEGORY 3

| | Max | Test | Delta |
|---|---|---|---|
| T(280-315) | 0.00 | Pass | 0.98 |
| T(316-350) | 0.00 | Pass | 4.92 |
| SOLAR UVA | 0.00 | Pass | 4.92 |

AUSTRALIAN STANDARDS

| | Red | Violet |
|---|---|---|
| FACTOR | 1.19 | 0.05 |

This is a GENERAL PURPOSE SUNGLASS
FAIL  FAIL

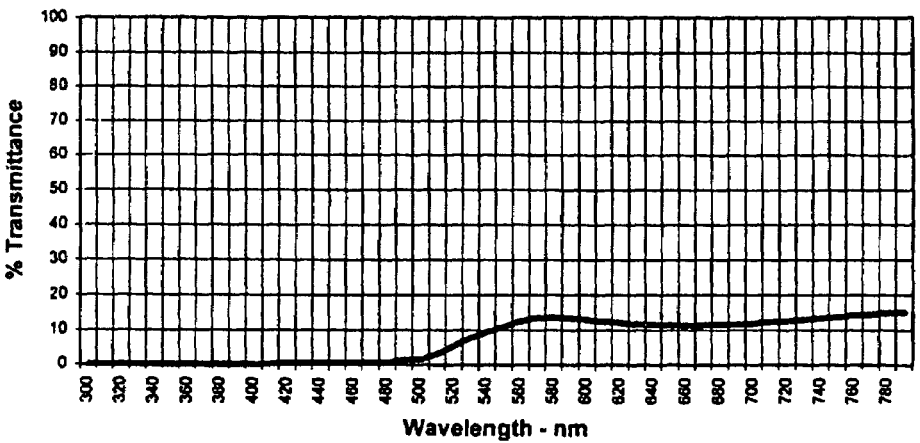

FIG. 4

Spectral Analysis

|  | TRANS | x | y |
|---|---|---|---|
| Iluminate C Photopic | 17.80% | 0.4369 | 0.4180 |
| Iluminate D65 | 17.68% | | |
| Iluminate A | 19.69% | | |
| Iluminate C Scotopic | 10.41% | | |
| Average Blue Light | 4.90% | | |
| UVA | 0.00% | | |
| UVB | 0.00% | | |

| nm | %T | nm | %T |
|---|---|---|---|
| 300 | 0.00 | 550 | 15.34 |
| 310 | 0.00 | 560 | 20.06 |
| 320 | 0.00 | 570 | 22.41 |
| 330 | 0.00 | 580 | 23.37 |
| 340 | 0.00 | 590 | 23.60 |
| 350 | 0.00 | 600 | 24.11 |
| 360 | 0.12 | 610 | 24.62 |
| 370 | 0.63 | 620 | 24.90 |
| 380 | 1.07 | 630 | 25.05 |
| 390 | 2.81 | 640 | 25.13 |
| 400 | 3.78 | 650 | 25.42 |
| 410 | 3.61 | 660 | 25.98 |
| 420 | 3.28 | 670 | 26.75 |
| 430 | 3.23 | 680 | 27.67 |
| 440 | 3.41 | 690 | 28.37 |
| 450 | 4.19 | 700 | 28.82 |
| 460 | 5.26 | 710 | 29.03 |
| 470 | 6.45 | 720 | 29.05 |
| 480 | 7.58 | 730 | 28.95 |
| 490 | 8.57 | 740 | 28.74 |
| 500 | 12.08 | 750 | 28.49 |
| 510 | 13.35 | 760 | 28.20 |
| 520 | 13.17 | 770 | 27.83 |
| 530 | 11.59 | 780 | 27.54 |
| 540 | 11.46 | 790 | 27.25 |

ANSI Z80.3

|  | Red | Yellow | Green | D65 |
|---|---|---|---|---|
| TRANS | 25.38% | 22.35% | 14.76% | 17.68% |
| TEST | Pass | Pass | Pass | |
| X | | 22.21 | 1.72 | 19.23 |
| Y | 2.76 | 15.27 | 3.20 | 18.69 |
| Z | | 0.03 | 1.30 | 6.12 |
| x | | 0.5920 | 0.2768 | 0.4367 |
| y | | 0.4072 | 0.5137 | 0.4244 |
| Chromiticity | | Pass | Pass | Pass |

This is a GENERAL PURPOSE LENS

CEN 84

|  | Red | Yellow | Green | Blue |
|---|---|---|---|---|
| TRANS | 24.83% | 22.41% | 14.63% | 13.53% |
| Q | 1.40 | 1.27 | 0.83 | 0.77 |
| TEST | Pass | Pass | Pass | Fail |

This is a FILTER CATEGORY 3

|  | Max | Test | Delta |
|---|---|---|---|
| T(280-315) | 0.00 | Pass | 1.77 |
| T(316-350) | 0.00 | Pass | 8.84 |
| SOLAR UVA | 0.00 | Pass | 8.84 |

AUSTRALIAN STANDARDS

|  | Red | Violet |
|---|---|---|
| FACTOR | 1.42 | 0.24 |

This is a GENERAL PURPOSE SUNGLASS
PASS    FAIL

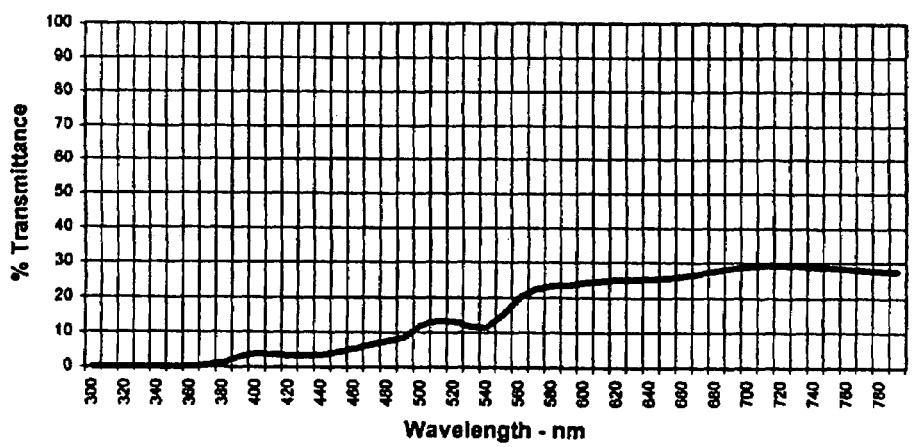

FIG. 5    O-BZS030701-01-01 (Ray Ban Daddy O)

Spectral Analysis

| | TRANS | x | y |
|---|---|---|---|
| Iluminate C Photopic | 24.30% | 0.5425 | 0.4364 |
| Iluminate D65 | 23.97% | | |
| Iluminate A | 29.70% | | |
| Iluminate C Scotopic | 6.40% | | |
| Average Blue Light | 0.85% | | |
| UVA | 0.01% | | |
| UVB | 0.00% | | |

| nm | %T | nm | %T |
|---|---|---|---|
| 300 | 0.00 | 550 | 20.05 |
| 310 | 0.00 | 560 | 24.55 |
| 320 | 0.00 | 570 | 30.46 |
| 330 | 0.01 | 580 | 38.21 |
| 340 | 0.02 | 590 | 43.80 |
| 350 | 0.02 | 600 | 44.90 |
| 360 | 0.02 | 610 | 46.00 |
| 370 | 0.04 | 620 | 48.28 |
| 380 | 0.16 | 630 | 47.00 |
| 390 | 0.44 | 640 | 46.23 |
| 400 | 0.70 | 650 | 44.91 |
| 410 | 0.62 | 660 | 45.28 |
| 420 | 0.50 | 670 | 48.40 |
| 430 | 0.51 | 680 | 55.47 |
| 440 | 0.57 | 690 | 64.74 |
| 450 | 0.73 | 700 | 73.63 |
| 460 | 0.89 | 710 | 81.96 |
| 470 | 0.96 | 720 | 85.52 |
| 480 | 1.12 | 730 | 88.63 |
| 490 | 1.62 | 740 | 89.54 |
| 500 | 2.88 | 750 | 90.06 |
| 510 | 3.40 | 760 | 90.94 |
| 520 | 4.76 | 770 | 90.55 |
| 530 | 9.19 | 780 | 91.03 |
| 540 | 15.54 | 790 | 91.27 |

ANSI Z80.3

| | Red | Yellow | Green | D65 |
|---|---|---|---|---|
| TRANS | 47.16% | 37.12% | 15.31% | 23.97% |
| TEST | Pass | Pass | Pass | |
| X | | 39.24 | 2.32 | 31.29 |
| Y | 5.13 | 25.37 | 3.32 | 25.33 |
| Z | | 0.04 | 0.26 | 1.18 |
| x | | 0.6069 | 0.3938 | 0.5414 |
| y | | 0.3924 | 0.5620 | 0.4382 |
| Chromiticity | | Pass | Pass | Pass |

This is a GENERAL PURPOSE LENS

CEN 94

| | Red | Yellow | Green | Blue |
|---|---|---|---|---|
| TRANS | 46.19% | 37.35% | 14.95% | 12.84% |
| Q | 1.93 | 1.56 | 0.62 | 0.54 |
| TEST | Pass | Pass | Fail | Fail |

This is a FILTER CATEGORY 2

| | Max | Test | Delta |
|---|---|---|---|
| T(280-315) | 0.00 | Pass | 2.40 |
| T(316-350) | 0.00 | Pass | 11.98 |
| SOLAR UVA | 0.00 | Pass | 11.98 |

AUSTRALIAN STANDARDS

| | Red | Violet |
|---|---|---|
| FACTOR | 1.93 | 0.03 |

This is a GENERAL PURPOSE SUNGLASS
PASS   FAIL

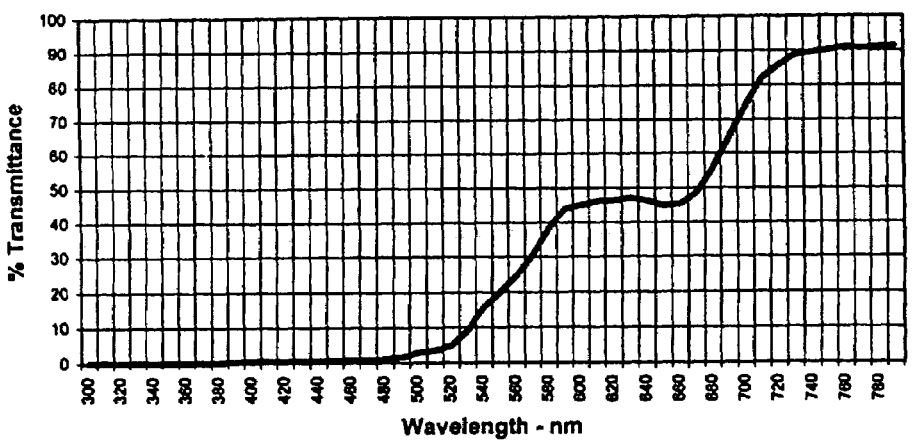

FIG. 6   O-BZS030701-02-01 (BluBlocker 1870)

Spectral Analysis

| | TRANS | x | y |
|---|---|---|---|
| Iluminate C Photopic | 12.83% | 0.4465 | 0.4204 |
| Iluminate D65 | 12.74% | | |
| Iluminate A | 14.34% | | |
| Iluminate C Scotopic | 7.18% | | |
| Average Blue Light | 2.58% | | |
| UVA | 0.00% | | |
| UVB | 0.00% | | |

| nm | %T | nm | %T |
|---|---|---|---|
| 300 | 0.00 | 550 | 10.46 |
| 310 | 0.00 | 560 | 12.93 |
| 320 | 0.00 | 570 | 15.91 |
| 330 | 0.00 | 580 | 18.08 |
| 340 | 0.00 | 590 | 18.66 |
| 350 | 0.00 | 600 | 18.50 |
| 360 | 0.00 | 610 | 18.16 |
| 370 | 0.00 | 620 | 17.89 |
| 380 | 0.00 | 630 | 17.72 |
| 390 | 0.00 | 640 | 17.78 |
| 400 | 0.00 | 650 | 18.26 |
| 410 | 0.04 | 660 | 19.25 |
| 420 | 0.23 | 670 | 20.68 |
| 430 | 0.66 | 680 | 22.51 |
| 440 | 1.63 | 690 | 24.44 |
| 450 | 3.07 | 700 | 26.52 |
| 460 | 4.48 | 710 | 28.97 |
| 470 | 5.36 | 720 | 31.41 |
| 480 | 5.72 | 730 | 34.13 |
| 490 | 5.89 | 740 | 37.26 |
| 500 | 7.66 | 750 | 40.38 |
| 510 | 7.93 | 760 | 43.65 |
| 520 | 8.32 | 770 | 47.20 |
| 530 | 8.77 | 780 | 50.53 |
| 540 | 9.30 | 790 | 53.60 |

ANSI Z80.3

| | Red | Yellow | Green | D65 |
|---|---|---|---|---|
| TRANS | 18.45% | 16.40% | 10.37% | 12.74% |
| TEST | Pass | Pass | Pass | |
| X | | 16.43 | 1.25 | 14.10 |
| Y | 2.01 | 11.21 | 2.25 | 13.46 |
| Z | | 0.02 | 0.91 | 4.06 |
| x | | 0.5939 | 0.2836 | 0.4459 |
| y | | 0.4053 | 0.5096 | 0.4256 |
| Chromiticity | | Pass | Pass | Pass |

This is a GENERAL PURPOSE LENS

CEN 94

| | Red | Yellow | Green | Blue |
|---|---|---|---|---|
| TRANS | 18.36% | 16.47% | 10.26% | 9.58% |
| Q | 1.44 | 1.29 | 0.81 | 0.75 |
| TEST | Pass | Pass | Pass | Fail |

This is a FILTER CATEGORY 3

| | Max | Test | Delta |
|---|---|---|---|
| T(280-315) | 0.00 | Pass | 1.27 |
| T(316-350) | 0.00 | Pass | 6.37 |
| SOLAR UVA | 0.00 | Pass | 6.37 |

AUSTRALIAN STANDARDS

| | Red | Violet |
|---|---|---|
| FACTOR | 1.42 | 0.18 |

This is a GENERAL PURPOSE SUNGLASS
PASS  FAIL

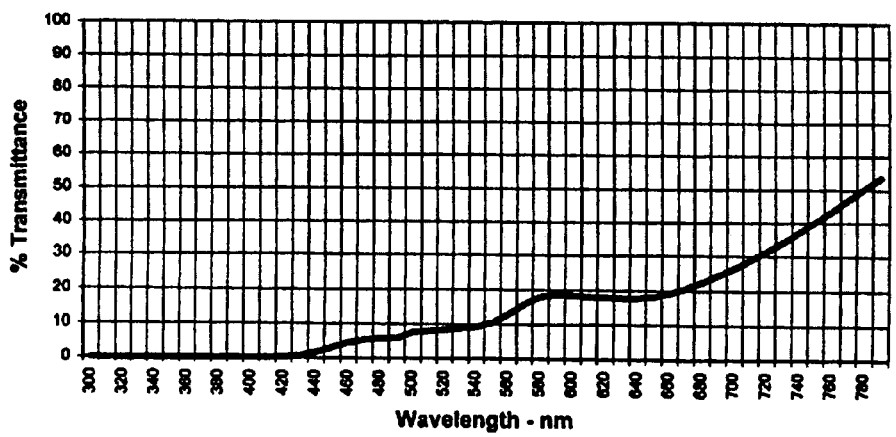

FIG. 7   O-BZS030701-03-01 (Costa Del Mar Islamorada)

Spectral Analysis

| | TRANS | x | y |
|---|---|---|---|
| Iluminate C Photopic | 31.10% | 0.4258 | 0.4252 |
| Iluminate D65 | 31.01% | | |
| Iluminate A | 33.83% | | |
| Iluminate C Scotopic | 19.23% | | |
| Average Blue Light | 8.93% | | |
| UVA | 0.00% | | |
| UVB | 0.00% | | |

| nm | %T | nm | %T |
|---|---|---|---|
| 300 | 0.00 | 550 | 30.04 |
| 310 | 0.00 | 560 | 32.33 |
| 320 | 0.00 | 570 | 34.41 |
| 330 | 0.00 | 580 | 36.23 |
| 340 | 0.00 | 590 | 37.68 |
| 350 | 0.00 | 600 | 39.03 |
| 360 | 0.00 | 610 | 40.43 |
| 370 | 0.00 | 620 | 41.65 |
| 380 | 0.00 | 630 | 42.82 |
| 390 | 0.00 | 640 | 43.97 |
| 400 | 0.02 | 650 | 45.22 |
| 410 | 0.56 | 660 | 46.70 |
| 420 | 2.47 | 670 | 48.24 |
| 430 | 4.45 | 680 | 49.95 |
| 440 | 6.38 | 690 | 51.53 |
| 450 | 8.20 | 700 | 53.10 |
| 460 | 9.99 | 710 | 54.75 |
| 470 | 11.88 | 720 | 56.27 |
| 480 | 13.56 | 730 | 57.83 |
| 490 | 15.18 | 740 | 59.51 |
| 500 | 21.03 | 750 | 61.06 |
| 510 | 23.04 | 760 | 62.73 |
| 520 | 24.50 | 770 | 64.39 |
| 530 | 26.19 | 780 | 66.01 |
| 540 | 28.02 | 790 | 67.56 |

ANSI Z80.3

| | Red | Yellow | Green | D65 |
|---|---|---|---|---|
| TRANS | 44.06% | 37.10% | 27.37% | 31.01% |
| TEST | Pass | Pass | Pass | |
| X | | 36.89 | 2.98 | 32.20 |
| Y | 4.80 | 25.35 | 5.93 | 32.77 |
| Z | | 0.06 | 2.35 | 10.79 |
| x | | 0.5921 | 0.2646 | 0.4250 |
| y | | 0.4069 | 0.5268 | 0.4325 |
| Chromiticity | | Pass | Pass | Pass |

This is a GENERAL PURPOSE LENS

CEN 94

| | Red | Yellow | Green | Blue |
|---|---|---|---|---|
| TRANS | 41.77% | 37.21% | 27.34% | 25.08% |
| Q | 1.35 | 1.20 | 0.88 | 0.81 |
| TEST | Pass | Pass | Pass | Pass |

This is a FILTER CATEGORY 2

| | Max | Test | Delta |
|---|---|---|---|
| T(280-315) | 0.00 | Pass | 3.10 |
| T(315-350) | 0.00 | Pass | 15.51 |
| SOLAR UVA | 0.00 | Pass | 15.51 |

AUSTRALIAN STANDARDS

| | Red | Violet |
|---|---|---|
| FACTOR | 1.40 | 0.20 |

This is a GENERAL PURPOSE SUNGLASS
PASS    FAIL

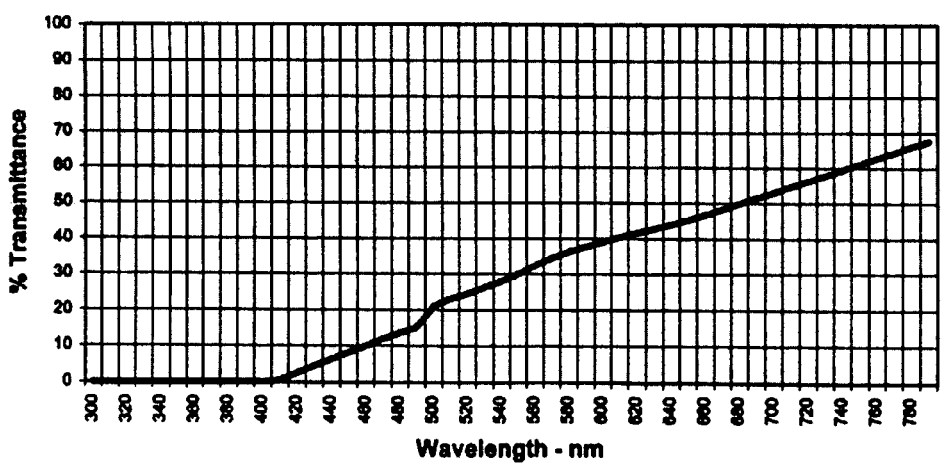

FIG. 8    O-BZS030701-04-01 (Melavision)

WATERMAN'S SUNGLASS LENS

CROSS-REFERENCE TO RELATED APPLICATIONS

The present application is a continuation-in-part of U.S. application Ser. No. 10/000,062, filed: Nov. 2, 2001 abandoned, which in turn derives priority from U.S. Provisional Patent Applications Nos. 60/245,304 and 60/266,497, both for "WATERMAN'S SUNGLASS LENS", filed: Nov. 3, 2000 and Feb. 5, 2001, respectively.

BACKGROUND OF THE INVENTION

1. Field of the Invention

The present invention relates to sunglasses and, more particularly, to an improved multi-layer lightweight CR-39™, polarized, dielectric-mirrored sunglass lens with blue-light blocking amber coloration specifically designed to enhance viewable images while reducing ocular photochemical damage from UV light.

2. Description of the Background

Quality polarized sunglasses have evolved to the point where they often incorporate numerous layers and coatings all of which combine to provide a particular light transmission profile. The efficacy of each layer affects that of each subsequent layer, and a good design effort often involves the balancing of numerous optical constraints in pursuit of a synergistic result. The lenses should protect the eyes 100% from ultraviolet light damage while at the same time providing contrast enhancement for maximum sight. Some existing lenses do well at protecting the eye from harmful light, yet markedly reduce overall light transmission to the point where it is more difficult to resolve images. Others offer increased resolution but little or no protection.

Considerable information has been published over the past several years regarding UV radiation, and its potential for damaging the human eye. Ultraviolet radiation is a form of electromagnetic radiation with wavelengths between 190 and 380 nanometers (nm). Ultraviolet radiation falls within a range of wavelengths below visible light, generally between 100 and 400 nanometers, and can be divided into the following four regions:

| Wavelength | Type | Energy |
| --- | --- | --- |
| 100–200 nm | UV - Vacuum | Lowest |
| 315–380 nm | UV - A | Low |
| 280–315 nm | UV - B | Mid |
| 190–280 nm | UV - C | Highest |

Sunlight contains all four regions of UV radiation, and Vacuum UV and UVC are the most harmful to humans. However, the earth's ozone layer tends to block these types of ultraviolet radiation. Nevertheless, the occurrence of ocular injury from ultraviolet exposure has increased dramatically over the past few years, and this is thought to be a result of ozone layer depletion. Given current efforts to restore the ozone layer, it is optimistically predicted to reach original levels by the year 2050. Others speculate that the developing black markets for ozone-depleting agents such as CFC refrigerant will add further delay. Bergmanson et al., *Practicing Preventative Eye Care With UV-Blocking Eye Wear*, Contact Lens Spectrum (February 1998).

According to Prevent Blindness America, the American Academy of Ophthalmology, and the American Optometric Association, "Ultraviolet radiation can play a contributory role in the development of various eye disorders including age-related cataract, pterygium (growth of tissue from the white of the eye onto the cornea), cancer of the skin around the eye, photokeratitis (sunburn of the cornea) and corneal degeneration." Cataracts are a major cause of visual impairment and blindness worldwide. "We've found there is no safe dose of UV-B exposure when it comes to risk of cataract, which means people of all ages, races and both sexes should protect their eyes from sunlight year-round." Infeld, Karen, *Sunlight Poses Universal Cataract Risk*, Johns Hopkins Study, http://www.eurekalert.org/releases/jhu-sunposcat.html (1998).

Age-related macular degeneration (AMD) is the leading cause of blind registration in the western world, and its prevalence is likely to rise as a consequence of increasing longevity. Beatty et al., *The Role of Oxidative Stress in the Pathogenesis of Age-Related Macular Degeneration*, Survey of Ophthalmology, volume 45, no. 2 (September–October 2000). Macular pigment is also believed to limit retinal oxidative damage by absorbing incoming blue light and/or quenching reactive oxygen intermediates. Many putative risk factors for AMD have been linked to the lack of macular pigment, including female gender, lens density, tobacco use, light iris color, and reduced visual sensitivity. The absorbency spectrum of macular pigment peaks at 460 nm (Id at 165), and it has been calculated that carotenoids reduce the amount of blue light incident on the photoreceptors of the fovea by approximately 40%.

The incidence of visible blue light exposure is a contributing cause of AMD. Photochemical retinal injury in monkeys from visible blue light (441 nm) was shown by Ham et al., "Histologic Analysis of Photochemical Lesions Produced in Rhesus Retina by Short-wave-length Light", Invest Ophthalmol Vis Sci 17:1029–35 (1978). It was found that short-wavelength light resulted in damage to the photoreceptor outer segments, cellular proliferation, and other symptoms which resembled changes seen in AMD. It was reported that the power required to cause such damage was 70 to 1000 times lower for blue light (441.6 nm) than for infrared wavelengths (1064 nm) based on exposure times ranging from 1 to 100 seconds. This was confirmed by Wu et al. who showed that the mechanism of blue light induced cell death is apoptosis. Wu J et al., "Blue Light Induced Apoptosis in Rat Retina", Eye 13:577–83 (1999). Moreover, the ten-year Beaver Dam Eye Study was recently completed and is reviewed in the Arch Ophthalmology, vol. 122, p. 754–757 (May 2004). This study proves a direct correlation between the incidence of blue light and AMD but no association between UVA and UVB light and AMD.

As the entire population is potentially exposed to sunlight, the odds ratio of 13.6 and 2.19 for high exposure to visible blue light and AMD represent quite robust evidence in support of the sunlight/AMD hypothesis. Consequently, a sunlens that dramatically reduces visible blue light combined with a high degree of UVA and UVB protection will preserve visual function.

The Food and Drug Administration recommends that all sunglasses, prescription or non-prescription, block 99% of UVB and 95% of UVA. Most sunglasses on the market meet these criteria. Indeed, there are sunglasses for outdoor enthusiasts that can achieve 99% of both UVA & B obstruction. A quality lens will also strive to reduce glare, add contrast, and yet maintain color balance all to enhance vision. However, other than by limiting all visible light, known lenses do not specifically limit blue light, and this would be a great advantage in light of the AMD correlation.

The foregoing requires a lens with an optimum transmission profile that filters the different colors in proportion to their ability to damage the tissue of the retina, thereby reducing the risks of macular degeneration while actually improving vision. Presently, a number of advancements in lens technology give significant control over the transmission profile of lenses.

Polarization

It is common to provide polarized lenses in sunglasses to eliminate the horizontal transmission of reflected light through the lenses of the glasses to the eyes of the wearer. The polarizing layer blocks light at certain angles, while allowing light to transmit through select angles. This helps to negate annoying glare reflected off other surfaces such as water, snow, automobile windshields, etc. A polarized filter is produced by stretching a thin sheet of polyvinyl alcohol to align the molecular components in parallel rows. The material is passed through an iodine solution, and the iodine molecules likewise align themselves along the rows of polyvinyl alcohol. The sheet of polyvinyl is then applied to the lens with colored rows of iodine oriented vertically in order to eliminate horizontally reflected light. The sheet of polyvinyl may be applied to a lens in one of two ways: the lamination method or the cast-in mold method. To polarize a glass lens, the lamination method is used whereby the polyvinyl filter is sandwiched between two layers of glass. For plastic lenses, the cast-in mold method is used whereby the polyvinyl filter is placed within the lens mold. Relevant prior art patents might be seen in the Schwartz U.S. Pat. No. 3,838,913 and Archambault U.S. Pat. No. 2,813,459. A significant benefit of polarized lenses is the elimination of glare from reflective surfaces such as water.

Color Filters

Color filters can also provide excellent ultraviolet obstruction properties. For example, U.S. Pat. No. 4,952,046 (SunTiger) discloses an optical lens with an amber filter having selective transmissivity functions. This is the original "Blublocker" patent for amber lenses that substantially eliminates ultraviolet radiation shorter than 515 nm. The lens is substantially transparent to wavelengths greater than 636 nm which are most useful for high visual acuity in a bright sunlit environment. Similarly, U.S. Pat. No. 5,400,175 (SunTiger) discloses an amber filter having a cut-on at 550 nm. However, color-differentiation is highly distorted due to the deep orange tint as their deep yellow-orange tint weakens color differentiation.

It would be medically valuable to combine an amber-tinted filter to likewise eliminate all the UV light, and reduces visible blue light to its lowest possible level, without distorting color-differentiation.

Mirror Coatings

Various mirror coatings have been available to the sunglass industry for decades. These mirror coatings can be applied to the front and/or back surface of a lens to further reduce glare and provide protection against infrared rays. Metallic mirrors comprise a layer of metal deposited directly on a glass lens to create the equivalent of a one-way mirror. U.S. Pat. No. 4,070,097 to Gelber, Robert M (1978). However, most metallic oxide coatings have proven to be very susceptible to scratching and wear, especially near salt water. Salt water tends to degrade such coatings over time. In addition, metallic mirror coatings absorb light and generate heat. The more recent advent of dielectric mirror coatings solve some of the above-referenced problems. For one, dielectric coatings reflect light without absorption, thereby avoiding the discomfort of hot glasses. Moreover, dielectric coatings are more durable than metallic oxide coatings, especially in outdoor coastal environments. For example, a dielectric layer having a medium refractive index, e.g., a mixed TiO2 and SiO2 layer, has been used in a rear view mirror. U.S. Pat. No. 5,267,081 to Pein (1993). Similar titanium and quartz dielectric mirror coatings have been applied to glass lenses. In the context of sunglasses, these dielectric mirror coatings of titanium and quartz prevent salt water damage while providing additional reflection of light. (Titanium Oxide, TiO3 being considered a dielectric material featuring dielectric constant k=20–85, see http://www.semiconductorglossary.com.)

U.S. Pat. Nos. 6,077,569 and 5,846,649 to Knapp et al. suggest a plastic sunglass lens coated with an abrasion resistant material and a dielectric material (including silicon dioxide or titanium oxide). The abrasion-resistant coating layer includes a transparent adhesion layer comprised of C, Si, H, O, and/or N which is deposited by ion-assisted plasma deposition. A second dielectric coating layer is deposited, and a thin metallic mirror layer may be interposed between the abrasion-resistant layer and the dielectric materials to enhance reflectivity and color characteristics. However, the prior art does not teach or suggest how to incorporate a polarizing filter, multi-layer dielectric mirror, and a hydrophobic overcoat in a blue-blocking amber or gray tint lens to provide an outstanding spectroscopic profile, especially for a marine environment.

Hydrophobic Coatings

Hydrophobic coatings are known in a more general context for protecting lens surfaces (U.S. Pat. No. 5,417,744 to Ameron) and for contact lenses (U.S. Pat. No. 4,569,858 to Barnes Hind). Hydrophobic coatings are also appropriate near water to protect underlying layers of a lens over time. Hydrophobic coatings are especially good for protecting mirrored lenses as above. For example, U.S. Pat. No. 5,928,718 to Dillon discloses a protective coating for reflective sunglasses incorporating a conventional resin/polymer type coating for protection of the mirror finish against abrasion and smudging.

In sum, it would be greatly advantageous to provide a synergistic combination of UV-absorbing light-weight CR-39™, specific amber tint, polarization, and dielectric mirror technology in such a way as to maximize visual acuity and yet reduce or eliminate the effect of macular degeneration due to UV light transmission. Specifically, it would be advantageous to provide a combination of: a) outer hydrophobic overcoat to protect the lens from smudging; b) multi-layer dielectric mirror which further reduces light-transmission and glare; and c) two layers of high-contrast ophthalmic CR-39 (plastic) having a medium amber-tint; d) the layers of CR-39 sandwiching a cast-in mold polarizing layer, and arranged to provide an unsurpassed light transmission profile in which there is 100% absorption of UVA & B light.

SUMMARY OF THE INVENTION

It is an object of the present invention to provide a sunglass lens specially adapted for use by watermen which adheres a multi-layer dielectric mirror to two layers of ophthalmic CR-39™ (plastic) and/or impact resistant polycarbonate sandwiching a polarizing filter. This combination reduces both glare and overall light transmission.

It is another object to incorporate the multi-layer dielectric mirror with a CR-39™ (plastic) and/or impact resistant polycarbonate lens to further decrease the transmission values of the tinted lens and yet provide outstanding durability characteristics.

It is another object to provide a lens as described above which incorporates the polarizing filter between two-layers of high-contrast blue-blocking amber-tinted ophthalmic CR-39 (plastic) and/or impact resistant polycarbonate to absorb 100% of ultraviolet light and reduce visible blue light transmission to less than 0.5%.

It is another object to provide a lens as described above that additionally includes an outer hydrophobic overcoat to protect the inner lens layers from seawater and smudging.

According to the present invention, the above-described and other objects are accomplished by providing an improved ten-layer light-weight CR-39™ or impact resistant polycarbonate, polarized, dielectric-mirrored lens for sunglasses. The lens includes an outer hydrophobic overcoat to protect the inner lens layers from smudging. Next is a six-layer dielectric mirror which further reduces light transmission. The mirror is bonded to two layers of CR-39 (plastic) or impact resistant polycarbonate, in medium amber tint, the foregoing layers sandwiching a polarizing filter for a total of ten layers.

Superior test results for the above-described lenses (for performance, function and durability) distinguish their transmission profile from existing lenses and evidence the synergistic relationship of the particular combination of layers.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 1 is a perspective exploded sketch showing the various lens layers according to the present invention.

FIG. 2 is a spectral analysis showing the light transmission profile of the improved multi-layer amber sunglass lens according to the present invention (Colts Labs).

FIG. 3 is a definition analysis showing the definition profile of the improved multi-layer amber sunglass lens according to the present invention.

FIG. 4 is a spectral analysis showing the light transmission profile of the improved multi-layer amber sunglass lens as above without the dielectric mirror or hydrophobic coating (Colts Labs).

FIG. 5 is a spectral analysis for comparative purposes showing the light transmission profile of competing Ray Bang® sunglass lens (Colts Labs).

FIG. 6 is a spectral analysis for comparative purposes showing the light transmission profile of competing Blu-Blocker® sunglass lens (Colts Labs).

FIG. 7 is a spectral analysis for comparative purposes showing the light transmission profile of competing Costa Del Mar® sunglass lens (Colts Labs).

FIG. 8 is a spectral analysis for comparative purposes showing the light transmission profile of competing Melavision® (Photoprotective Technologies) sunglass lens (Colts Labs).

DETAILED DESCRIPTION OF THE PREFERRED EMBODIMENTS

Disclosed is an improved ten-layer lightweight CR-39™ (plastic) polarized, dielectric mirrored sunglass that gives a light transmission profile in which 100% of UVA & B light absorption occurs in high contrast blue-blocking medium amber tint.

FIG. 1 is a perspective exploded sketch showing the various lens layers according to the present invention. The outermost layer 13 of lens 2 is a hydrophobic overcoat. The hydrophobic coating is preferably a silicon-based chemical coating of known type such as commercially available from OMS, 177108 Canada Inc., 5120 Courtrai, Suite 12, Montréal, Québec, Canada H3W 1A7. This coating 13 may be deposited by known dipping or chemical vapor deposition processes, and it makes the lens water repellant for better vision during rainstorms or water related activities. In addition, hydrophobic overcoat 13 makes the lens easier to clean as contaminants do not adhere to the lubricated lens surface easily. Moreover, the hydrophobic overcoat 13 resists smudging and streaking due to environmental and body contaminants. This hydrophobic layer 13 also produces a sealing effect to protect the lens and other base coatings, and to increases the longevity of the underlying layers. The hydrophobic coating 13 bonds with the lens to create a barrier against dirt, repelling dust, grease and liquid. The coating is non-acidic. It allows the lens to be cleaned with a wiping cloth without cleaning solution. The hydrophobic coating does not optically change the lens properties. It is extremely durable, and repels water as well as any other undesirable matter, including salt spray. The hydrophobic coating also combats bacterial build-up as dirt and oils do not stay on the lens.

The hydrophobic overcoat 13 is applied directly onto a multi-layered dielectric mirror layer 14. This dielectric stack comprises alternating layers of inorganic metal oxides, and it is well known how to form dielectric stacks, for example, from titanium oxide, silicon oxide, etc. Each of the plurality of layers has a different refractive index designed to cause interference of particular wavelengths of light. U.S. Pat. No. 5,844,225 to Kimock et al discloses an optical coating design formed in a multi-layer "dielectric stack" configuration for producing an anti-reflection feature, plus a method for fabricating a coated substrate product. Kimock et al. '225 also suggests various stacked layers inclusive of titanium oxide, nitride, zirconium nitride, boron nitride, yttrium oxide, silicon oxide, silicon dioxide, zirconium oxide, silicon carbide, aluminum oxide, aluminum nitride, and various mixtures thereof. The present invention employs a similar method to create a particular stacked layer 14 which actually comprises six thin film layers (2–3 nm total) comprising alternating layers of $TiO_2$, having a high refractive index of approximately 2.35, and $SiO_2$, having a low refractive index of about 1.45, each thin film layer being vacuum deposited to create a dielectric thin film stack that provides a reflective mirror finish. Dielectric mirrors in general combine high reflection values with outstanding durability characteristics. These coatings can generally exhibit significantly higher reflectance values than metallic films over specific wavelength intervals. The present stacked dielectric mirror layer 14 with particular constituents further optimizes the lens to reduce light transmission through the entire UV and visible light spectrum.

The next three lens layers 16–18 include a polarizing filter layer 17 bonded between two lightweight CR-39 (plastic) or polycarbonate layers 16, 18. Both CR-39 (plastic) or polycarbonate layers 16, 18 are specifically tinted medium-amber for its dramatic glare blocking properties which, in combination with the dielectric mirror 14, yield the particular light transmission profile of the present invention. Medium amber comprises a pigment composition of approximately 6.8 g iron oxide yellow and 133.2 g iron oxide red.

Either CR-39 (plastic) or polycarbonate lens blanks may be used as both types of materials are capable of molecular bonding, which is important for the following reasons.

For the polarizing filter layer 17, there are basically two types of polarized lens constructions, laminated and cast suspended filter. Laminated lenses are made by sandwiching the polarized film between layers of plastic or glass, utilizing an adhesive to hold it together. The adhesive can make the laminated lens appear hazy and the adhesion can fail when subjected to high heat and processing forces. The CR-39 polarized lens 16 of the present invention is cast with suspended filter and does not rely upon adhesives to hold everything together. Molecular bonding is used to chemically join the lens layers 16–18, thus totally encapsulating the polarizing filter layer 17 between the two CR-39™ plastic lens layers 16, 18, thereby avoiding haze and delamination.

The combination of the above-described hydrophobic layer 13, dielectric mirror layer 14, as well as polarizing lens layers 16–18 bonded between amber lens layers 16, 18, dramatically reduce glare and increase contrast in varying types of light conditions, and the bonded configuration is most durable for use in a marine environment.

FIG. 2 is a spectral analysis (with data print attached) showing the light transmission profile of the improved multi-layer amber sunglass lens according to the present invention. The attached spectral analysis was conducted by Colts Laboratories of Clearwater Fla., a leading analysis laboratory that is accredited by the American Association for Laboratory Accreditation to ISO Guide 25 and by the Safety Equipment Institute. Ultraviolet absorption of 100% occurs to at least 400 nm, average blue light transmission is an unprecedented 0.34%, and these profiles are optimum for improving acuity while preventing macular degeneration.

FIG. 3 is a definition analysis showing the definition profile of the improved multi-layer amber sunglass lens according to the present invention.

The definition analysis is an ANSI standard test for eye and face protective devices and rates the protectiveness of the lens in terms of angular protection and frontal protection. It is noteworthy that this particular ANSI Z87.1 specification is surpassed by the present lens.

FIG. 4 is a spectral analysis (with data print attached) showing the light transmission profile of the improved multi-layer amber sunglass lens as above without the dielectric mirror or hydrophobic coating. As before, it can be seen by comparing FIGS. 3 and 4 that the dielectric mirror layer 14 reduces light transmission by an additional 1–3 percent in the 500–600 nm range, providing the synergistic profile of the particular sandwich combination disclosed herein (again there is no increase in UV absorption as with metallic mirror coatings, but only a reduction in transmitted light). The same additional benefits of improved glare screening, scratch resistance and overall durability are gained.

FIGS. 5–8 are comparative test results with a few exemplary existing lenses.

Specifically, FIGS. 5–8 are spectral analyses for comparative purposes showing the light transmission profile of a competing Ray Ban® sunglass lens, BluBlocker® sunglass lens, Costa Del Mar® sunglass lens, and Melavision® sunglass lens, respectively. Comparison with the results for the present lenses as shown in FIG. 2 reveals a significant inability on the part of the competitors with regard to average blue light obstruction.

The average blue light filtering ability (% transmission) for the present lenses as compared to the test results of FIGS. 5–8 are as follows:

| Subject Lens | Average Blue Light Transmission (Lower is better) |
| --- | --- |
| Multi-layer amber lens of the present invention | 0.34% (FIG. 2) |
| BluBlocker ® sunglass lens | 0.85% (FIG. 6) |
| Costa Del Mar ® sunglass lens | 2.58% (FIG. 7) |
| Ray Ban ® sunglass lens | 4.90% (FIG. 5) |
| Melavision ® sunglass lens | 6.93% (FIG. 8) |

Comparing these results shows a much greater ability on the part of the present amber lens to filter blue light while also reducing glare, adding contrast, and maintaining color balance.

Only the BluBlocker lenses approach the same level of effectiveness, however, color discrimination is markedly reduced because of the blu-blocking deep orange coloration. The others increase the risk of photochemical retinal damage as described earlier. Therefore, the present invention outperforms all others with regard to preserving ocular physiological integrity (UV-A & B light is absorbed to higher wavelengths, and more visible blue light is filtered), and yet a balanced light transmission profile is maintained for better visual acuity.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A sunglass lens, comprising:
    a first layer of opthalmic plastic colorized with high-contrast blue-blocking amber-tint;
    a second layer of opthalmic plastic colorized with said high-contrast blue-blocking amber-tint;
    a polarizing layer encapsulated between said first and second opthalmic plastic layers;
    a multilayer dielectric mirror consisting of six thin film layers vacuum deposited atop the first layer of opthalmic plastic for further reducing overall light transmission and glare; whereby said layers are arranged to provide a balanced light transmission profile in which substantially 100% of UV-A & B light is blocked to at least 400 nm, and average blue light transmission of said lens is less than 0.4%.

2. The sunglass lens according to claim 1, wherein said first and second layers are CR-39™ plastic.

3. The sunglass lens according to claim 1, wherein said first and second layers are polycarbonate.

4. The sunglass lens according to claim 1, wherein said multi-layered dielectric mirror further comprises six thin film layers vacuum deposited atop said first layer of plastic for further reducing light transmission and glare.

5. The sunglass lens according to claim 4, wherein said multi-layered dielectric mirror further comprises a thickness of between 2–3 nm.

6. The sunglass lens according to claim 4, wherein said multi-layered dielectric mirror further comprises six alternating layers of $TiO_2$ and $SiO_2$.

7. The sunglass lens according to claim 6, wherein said $TiO_2$ has a high refractive index of approximately 2.35 and said $SiO_2$ has a low refractive index of about 1.45.

8. The sunglass lens according to claim 1, wherein said polarizing filter layer is molecularly bonded between said first and second opthalmic plastic layers to avoid haze and delamination.

9. The sunglass lens according to claim 1, wherein said first layer of opthalmic plastic and second layer of opthalmic plastic are both colorized with medium amber-tint.

10. A sunglass lens, comprising:
a first layer hydrophobic overcoat for protection.
a second layer dielectric mirror for reducing light transmission and glare, said dielectric mirror consisting of six thin film dielectric layers;
a third layer blue-blocking amber-tinted opthalmic plastic material;
a fifth layer blue-blocking amber-tintedopthalmic plastic material;
a fourth polarizing layer molecularly bonded to said third and fifth plastic layers and sandwiched there between to avoid haze and delamination;
whereby said layers are arranged to provide a balanced light transmission profile optimum for use on the water in which substantially 100% of UV-A & B light is blocked and at least 99% of blue light is blocked at up to 490 nm and average blue light transmission of said lens is less than 0.4%.

11. The sunglass lens according to claim 10, wherein said third and fifth layers are CR-39™ plastic.

12. The sunglass lens according to claim 10, wherein said third and fifth layers are polycarbonate.

13. The sunglass lens according to claim 12, wherein said multi-layered dielectric mirror further comprises a thickness of between 2–3 nm.

14. The sunglass lens according to claim 13, wherein said multi-layered dielectric mirror further comprises six alternating layers of $TiO_2$ and $SiO_2$.

15. The sunglass lens according to claim 14, wherein said $TiO_2$ has a high refractive index of approximately 2.35 and said $SiO_2$ has a low refractive index of about 1.45.

* * * * *